(12) United States Patent
Heisswolf et al.

(10) Patent No.: US 9,417,941 B2
(45) Date of Patent: Aug. 16, 2016

(54) PROCESSING DEVICE AND METHOD OF EXECUTING AN INSTRUCTION SEQUENCE

(71) Applicants: Dirk Heisswolf, Munich (DE); Damon Peter Broderick, Munich (DE); Andreas Ralph Pachl, Neubiberg (DE)

(72) Inventors: Dirk Heisswolf, Munich (DE); Damon Peter Broderick, Munich (DE); Andreas Ralph Pachl, Neubiberg (DE)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 156 days.

(21) Appl. No.: 14/283,784

(22) Filed: May 21, 2014

(65) Prior Publication Data

US 2015/0339177 A1 Nov. 26, 2015

(51) Int. Cl.
*G06F 11/00* (2006.01)
*G06F 11/07* (2006.01)
*G06F 11/14* (2006.01)
*G06F 9/38* (2006.01)
*G06F 11/30* (2006.01)

(52) U.S. Cl.
CPC .............. *G06F 11/0721* (2013.01); *G06F 9/38* (2013.01); *G06F 11/0775* (2013.01); *G06F 11/1479* (2013.01); *G06F 11/30* (2013.01); *G06F 2212/1008* (2013.01)

(58) Field of Classification Search
None
See application file for complete search history.

(56) References Cited

U.S. PATENT DOCUMENTS

| | | | | |
|---|---|---|---|---|
| 5,081,626 A * | 1/1992 | Scott | ........................ | G06F 11/28 714/724 |
| 6,728,872 B1 * | 4/2004 | Flacks | ................... | G06F 9/3802 712/233 |
| 2002/0087951 A1 * | 7/2002 | Bang | ..................... | G06F 11/362 717/124 |
| 2004/0015897 A1 * | 1/2004 | Thompson | .......... | G06F 9/44589 717/140 |
| 2004/0019457 A1 * | 1/2004 | Arisha | ................. | H04L 41/0677 702/182 |
| 2005/0251708 A1 * | 11/2005 | Bancel | ..................... | G06F 21/71 714/49 |
| 2007/0174750 A1 * | 7/2007 | Borin | ................... | G06F 11/1004 714/732 |
| 2009/0049549 A1 * | 2/2009 | Park | ......................... | G06F 21/55 726/22 |
| 2010/0293407 A1 * | 11/2010 | Locasto | .............. | G06F 11/3672 714/2 |
| 2011/0023118 A1 * | 1/2011 | Wright | .................... | G06F 11/28 726/23 |
| 2011/0185230 A1 * | 7/2011 | Agrawal | ............. | G06F 11/0751 714/26 |
| 2012/0144227 A1 * | 6/2012 | Perkins | ............... | G06F 11/0793 714/2 |
| 2014/0059383 A1 * | 2/2014 | Alapati | ............... | G06F 11/2236 714/27 |

OTHER PUBLICATIONS

Galla, Thomas M. et al., "Control Flow Monitoring for a Time-Triggered Communication Controller," the Pennsylvania State University CiteSeerX Archives, 1999, downloaded from <<http://citeseerx.ist.psu.edu/viewdoc/download?doi=10.1.1.10.6257&rep=rep1&type=pdf>> on May 19, 2014; 6 pages.

* cited by examiner

*Primary Examiner* — Gabriel Chu

(57) ABSTRACT

A processing device and a method of executing an instruction sequence are described. The processing device comprises a status register for providing a status word, wherein execution of an instruction by the processing device comprises updating the status word, wherein the instruction sequence comprises a subsequence of one or more selected instructions, and wherein execution of a selected instruction by the processing device further comprises a status check which comprises: providing a set of valid status words; verifying whether the updated status word is in the set of valid status words; and initiating an alert action if the updated status word is not in the set of valid status words.

18 Claims, 4 Drawing Sheets

Fig. 1

V=0, C=0, 16≥D≥2, 16≥[NUM_REV_BASE,SP]≥2

| Instruction | Flags |
|---|---|
| TFR D,X | V,C |
| CLRA | N,Z,V,C |
| LDAB NUM_REV_BASE,SP | N,Z,V,C |
| LDY NUM_REV_FLW,SP | V,C |
| EXG X,Y | V,C |
| EXG X,D | V,C |
| EDIV | N,V,C |
| STY NUM_REV_FLW,SP | N,V,C |
| ADDD NUM_REV_RLW,SP | Z→C |
| STD NUM_REV_RLW,SP | V(Z→C) |
| LDD NUM_REV_RMW,SP | V |
| ADCB #$00 | True |
| ADCA #$00 | True |
| STD NUM_REV_RMW,SP | V |
| LDD NUM_REV_RHW,SP | V |
| ADCB #$00 | True |
| ADCA #$00 | C |
| STD NUM_REV_RHW,SP | V,C |

Fig. 2

2.1:
```
TFR  D,X
BRA  *+4
DW   PROP1
```
CLRA
LDAB NUM_REV_BASE,SP
LDY  NUM_REV_FLW,SP
EXG  X,Y
EXG  X,D
EDIV 2.2:
```
BRA  *+4
DW   PROP2
```
STY  NUM_REV_FLW,SP
ADDD NUM_REV_RLW,SP 2.3:
```
BRA  *+4
DW   PROP3
```
STD  NUM_REV_RLW,SP
LDD  NUM_REV_RMW,SP

```
TFR  D, X
SWI  ;Software Interrupt      ⎫ 5.1
DW   PROP1                    ⎭
CLRA
LDAB NUM_REV_BASE,SP
LDY  NUM_REV_FLW,SP
EXG  X, Y
EXG  X, D
EDIV
SWI  ;Software Interrupt      ⎫ 5.2
DW   PROP2                    ⎭
STY  NUM_REV_FLW,SP
ADDD NUM_REV_RLW,SP
SWI  ;Software Interrupt      ⎫ 5.3
DW   PROP3                    ⎭
STD  NUM_REV_RLW,SP
LDD  NUM_REV_RMW,SP
...
```

PROCESSING DEVICE AND METHOD OF EXECUTING AN INSTRUCTION SEQUENCE

FIELD OF THE INVENTION

This invention relates to a processing device and to a method of executing an instruction sequence.

BACKGROUND OF THE INVENTION

A computing system may comprise a means for detecting malfunction of the computing system autonomously. Auto diagnosis tools can be particularly beneficial for safety applications. Detection of malfunction generally requires some amount of redundancy to the system's resources. This redundancy usually has a price, as it may involve additional hardware or reduce the performance of the system. As trade-offs must be made between the detectability of potential faults and the additional system cost, a broad spectrum of safety features, capable of detecting a system failure, have been devised in the past.

Detection of malfunction is in particular important for safety critical apparatuses, which may, for example, be any technical apparatuses, wherein an improper usage, unexpected failure or malfunction may result in major damages or dangerous situations, for example, for the operators or other people. A safety critical apparatus, may, for example, be (a part of) a power plant, a chemical or other industrial plant, a railway control centre or any vehicle that carries at least an operator or moves fast enough to cause damages to the ambient environment in case of a malfunction.

One technique, known as lock step, is an example of a very costly solution. In the lock step technique, the computing system, or at least parts thereof, are duplicated and operated in parallel. Faults may be detected by comparing the behaviour of both systems.

SUMMARY OF THE INVENTION

The present invention provides a processing device and a method as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

FIG. 1 schematically shows an example of an instruction sequence along with a corresponding sequence of status flag test functions.

FIG. 2 schematically shows an example of an instruction sequence with embedded check instructions.

DETAILED DESCRIPTION OF THE PREFERRED EMBODIMENTS

Figure 3:
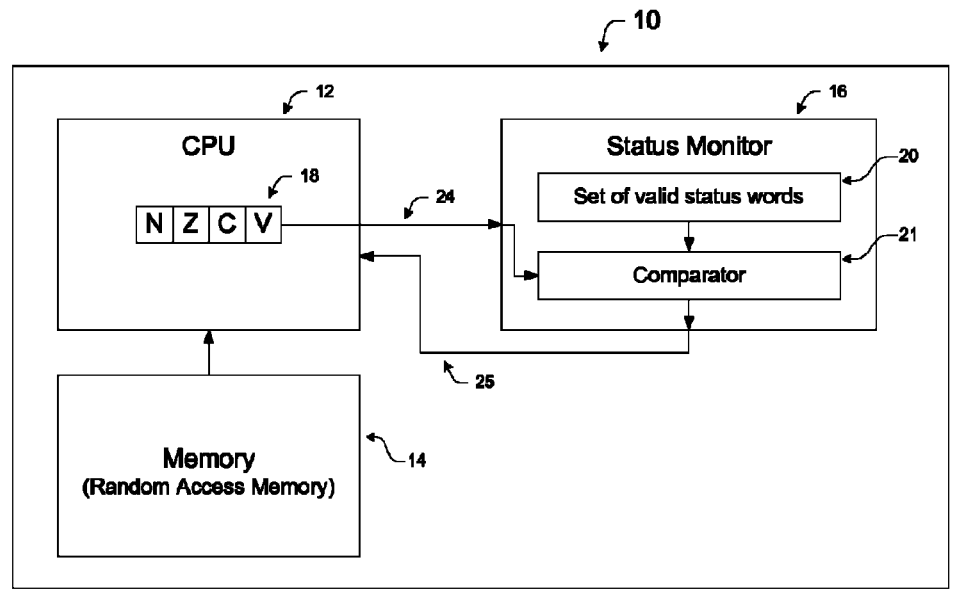
FIG. 3 schematically shows an example of an embodiment of a data processing device.

FIG. 1 schematically illustrates an example of an instruction sequence, that is, a sequence of executable instructions, which may also be referred to as a code sequence. A processor, e.g., a central processing unit, of a data processing device may be arranged to execute the instruction sequence. The processor may comprise a status register for providing a set of status flags. The status register may be a hardware register. The status flags, also known as condition register flags, condition flags, condition code, condition code flags, or "properties", may provide information about the state of the processor. The processor may be arranged to update the values of the status flags (status flag values) with each instruction cycle, that is, with each instruction that is executed by the processor. Updating the status flag values may change or not change the status flag values. The status flags may, for example, comprise a zero flag Z, a carry flag C, a sign flag N, and an overflow flag V. The zero flag Z may indicate that the result of an operation was zero. The carry flag C may indicate an overflow of an unsigned operation. The sign flag N may indicate that the result of an operation is less than zero. The overflow flag V may indicate an overflow of a signed operation.

In the absence of faults, the status flag values associated with a certain instruction of an instruction sequence, that is, the status flag values upon execution of the instruction, or certain relations between the status flag values, for a given instruction sequence, may depend on only the input data of the instruction sequence. Input data may include values defined prior to starting execution of the instruction sequence as well as data which is determined during the execution of the instruction sequence, e.g., user input. When the input data or expected value ranges of the input data are known before starting execution of the instruction sequence, the values of the status flags during execution of the instruction sequence may be also known, at least in principle, which means that they can be deduced logically from the input data. Even when part or all of the input data not known until execution of the instruction sequence, e.g., by user input operated in response to the execution of the instruction sequence, but the value range of the input data is within expected limits, status flag values may be predictable at compile time or execution time of the instruction sequence.

For each instruction of the instruction sequence, a status flag test function may thus be generated on the basis of the instruction sequence, or on the basis of a source code of the instruction sequence, and on the basis of assumptions about input data to the instructions of the instruction sequence, without executing the instruction sequence. The status flag test function may be a boolean-valued function of the status flag values representing the function arguments. In the example, the first instruction, TFR (Transfer Register to Register), may be assigned the status flag test function $\neg V \cdot \neg C$, wherein $\neg$ means logical negation ("NOT") and the dot "·" means the logical conjunction "AND". The status flag test function $\neg V \cdot \neg C$ returns the value TRUE (or 1) if and only if V=FALSE (or 0) and C=FALSE (or 0). Similarly, the second instruction of the sequence, CLRA (Clear Register Accumulator), may be assigned the status flag test function $\neg N \cdot Z \cdot$ ¬V•¬C, which returns TRUE if and only if N, Z, V, and C are 0, 1, 0, and 0. As a further example, the ninth instruction, "ADDD NUM_REV_RLW,SP" (Add Double), may be assigned the status flag test function Z→C wherein the arrow "→" indicates the logical implication, which returns TRUE if Z is FALSE or C is TRUE, wherein N and V may be TRUE or FALSE.

If the instruction sequence is executed correctly, i.e. the input values to the instructions are within the intended limits, the status flag test functions associated with instructions of the instruction sequence return the function value TRUE (or 1) after each instruction. The sequence of status flag test functions associated with the instruction sequence may be monitored to detect possible faults during execution of the instruction sequence. Such faults may occur, for example, as a consequence of voltage transients in the processor or by neutron impact, and may represent a safety risk. In the event of a fault, a status flag test function may return the value FALSE (or zero) because the input values may be outside the intended limits. The fault may thus be detected if one of the status flag test function associated with an instruction of the instruction sequence takes the value FALSE. It is noted however, that not every fault may cause the status flag test function to return the value FALSE. Not every fault may therefore be detectable by means of the status flag test function. Nevertheless, monitoring the values of the status flag test functions associated with one or more instructions of the instruction sequence may increase the probability to detect faults.

Assigning a boolean-valued status flag test function to an instruction of the instruction sequence may be equivalent to partitioning the complete set of status flag tuples representing the complete set of possible function arguments, into two subsets, namely a set of allowed status flag tuples (referred to below as valid status words) and a set of forbidden status flag tuples.

A function is a relation between sets of input arguments and output values with the property that each set of input arguments is related to exactly one output value. The boolean-valued status flag test function has two possible output function values, which are either TRUE (or 1) or FALSE (or 0). Accordingly, the complete set of possible function arguments may be divided into the set of allowed status flag tuples (or valid status words) and the set of forbidden status flag tuples. When applying the status flag test function to one of the set of allowed status flag tuples (or valid status word), the status flag test function takes the function value TRUE (or 1) and when applying the status flag test function to one of the set of forbidden status flag tuples, the status flag test function takes the function value FALSE (or 0).

A status flag tuple or status word is the tuple of status flag values provided by the status register, e.g., the tuple (N, Z, V, C), and representing the input arguments to the status flag test function. Each component of the status flag tuple may be either TRUE or FALSE, or, equivalently, 1 or 0. Thus, the complete set of theoretically possible status flag tuples has 2**K (two to the power K) elements wherein K is the dimension (number of function arguments) or bit length of the status flag tuple, i.e., wherein K is the total number of status flags. In the example of FIG. 1, K=4. Generally, a status word may include any status information of the device, e.g., status information about a CPU, peripheral IP, and sensors. In other words, the technique described herein is not limited to the example in which a status word comprises the flags N, Z, V, and C described above.

As explained above, the complete set of status flag tuples may include status flag tuples which the status register can take only in a fault event during or before execution of an instruction of the instruction sequence. For instance, referring again to the first instruction, TFR, in the example of FIG. 1, a status flag tuple in which the overflow flag V or the carry flag C is 1 (or TRUE) can only occur in a fault event. Applying the status flag test function to a status flag tuple, which is part of the set of allowed status flag tuples, yields the value TRUE. Applying the status flag test function to a status flag tuple, which is part of the set of forbidden status flag tuples, yields the value FALSE.

Again, it is to be understood that each instruction of the instruction sequence may be associated to its specific status flag test function and have its own set of allowed status flag tuples; this means that status flag test functions and the sets of allowed status flag tuples may differ from one instruction to the next instruction.

The tuple of status flags provided by the status register may also be referred to as the status word. From the above, it is understood that each instruction of the instruction sequence may have assigned a set of valid status words, that is, a set of status flag tuples which may be taken with regard to the input data of the instruction or by characteristics of the instruction. In the example of FIG. 1, the set of valid status words associated with the second instruction, CLRA, may consist of a single tuple (0, 1, 0, 0). Other instructions may have sets of valid data words associated with them which sets comprise several, i.e. two or more, valid status words.

FIG. 3 schematically illustrates an example of an embodiment of a processing device 10. The processing device 10 may, for example, be a system on chip (SoC) or a component of an SoC. In the example, the processing device 10 may comprise a processor 12, e.g., a central processing unit (CPU), a memory unit 14, and a status flag monitoring unit 16, for example. The memory unit 14, operatively connected to the processing unit 12, may be arranged to provide the instruction sequence, or multiple instruction sequences. The memory unit 14 may, for example, be a random access memory (RAM) unit. Alternatively, the instruction sequence may be hardcoded, for example. The processing device 10 may comprise a status register 18 arranged to provide a status word which is a tuple of K status flags, e.g., the tuple (N, Z, C, V).

The status flag monitoring unit 16, operatively connected to the processing unit 12 and the status flag monitoring unit 16, further comprises a comparator 21, which is arranged to verify whether the updated status word is in the set of valid status words 20 provided to the status flag monitoring unit 16.

The instruction sequence may comprise a sub-sequence of one or more instructions at which the condition code flags are monitored and which may be referred to herein as selected instructions. The processing device 10 is arranged to update the status word in the status register 18 in response to the execution of an instruction, in particular in response to the execution of each instruction. The instruction sequence to be executed by the processing device 10 may include one or more selected instructions. Upon execution of one of the selected instructions by the processing device 10, the processing device is arranged to initiate or trigger a status check performed by the status flag monitor 16. The status flag monitor 16 is arranged to verify whether the updated status word is in the set of valid status words by the comparator 21 of the status flag monitoring unit 16; and to initiate or assert an alert action in response to the result output of the comparator 21 if the updated status word is not in the set of valid status word. The processing device 10 is arranged to provide the set of valid status words to the status flag monitor 16. For example, the status flag monitoring unit 16 and the comparator 21 thereof may be arranged to check for each selected instruction the updated status word against a set of valid status words 20, which, e.g., has been fetched from memory, and to initiate the alert action if the updated status word is not in the set of valid status words. In a variant of the shown example, the status flag monitoring unit 16 may be integrated in the processor 12.

In one example, the subsequence of selected instructions comprises every instruction of the instruction sequence. In other words, the subsequence of selected instructions and the instruction sequence may be identical. In another example, the subsequence of selected instructions is a subset of the instruction sequence. In this case, not every instruction of the instruction sequence is a selected instruction. The selected instructions are those instructions for which the updated status word is checked to determine whether it is in the set of valid status words, i.e., whether the updated status flags have values which are not in opposition to, e.g., input data or the preceding instruction flow. When the updated status word is not in the set of valid status words, this may indicate that a fault has occurred. Initiating the alert action may enable a suitable response to the possible occurrence of a fault.

The instruction sequence, e.g., the instruction sequence in FIG. 1, may comprise one or more instructions, in response to execution of which a fault event is detectable from the state (or updated status word) of the status register. An example of such an instruction, which does not allow for detection a fault event from the state of the status register, is the second instruction, CLRA, of the instruction sequence in FIG. 1. The CLRA instructs the processing device to clear the CPU's accumulator register and to set all four condition code flags to a fixed value. As this instruction always returns the same tuple of condition code flags, it is unlikely to detect any data or program flow corruption. This instruction may therefore be excluded from the subsequence of instructions for which the status word is to be checked, without significantly reducing the fault detection capability of the scheme. The instruction sequence may comprise further instructions that may be omitted in the subsequence of selected instructions, thus saving resources.

For the sake of completeness, it should be noted that the above consideration apply to instructions without input values, i.e. instructions which do not instruct to process one or more input values. Evaluating the status word of the status register 18 may allow for detecting defects in the generation of the one or more flags held in the status register 18. An instruction sequence, which makes use of the flags held in the status register 18 may be carried out erroneously in such a case.

The processing device 10 may be arranged, in response to execution of each of the non-selected instructions, to set the status word 18 to a value, which is independent of input data of the instruction sequence and results of preceding instructions of the instruction sequence. The processing device 10 may also be arranged, in response to execution of each of the selected instructions, to set the status word to a value, which depends on at least one of input data of the instruction sequence and on results of preceding instructions of the instruction sequence.

Every instruction of the instruction sequence may be rated for delectability of fault events including data or program flow corruption. This rating may occur in a continuous spectrum. Instructions of relevance for detecting errors during program execution may be selected and annotated with a status word check. The selection of the instructions, in response to which the status word of the status register is checked, may be performed in dependence of application-related parameters, which for instance indicate one or more portions of the instruction sequence carrying out safety relevant operations. This selection of instructions may also depend on resource requirements such as available memory space, and performance requirements.

For a given instruction of the instruction sequence, the set of valid status words may be defined, for instance, in terms of a bit string of length $2^{}K$ (two to the power K), wherein K is the bit length of the status word, i.e., K is the total number of status flags. It is noted that when the status register comprises K status flags, there is a total of 2 to the power K different possible status words. Each of these $2^{}K$ status words may have assigned a corresponding component of the bit string to indicate whether the respective status word is a valid status word or not. The bit string thus defined, the set of valid status words, and the status flag test function are equivalent concepts. In other words, they may provide essentially the same information. It is pointed out that the set of valid status words, or, equivalently, the status flag test function do not have to be represented by a bit string but can be encoded differently.

Figure 4:
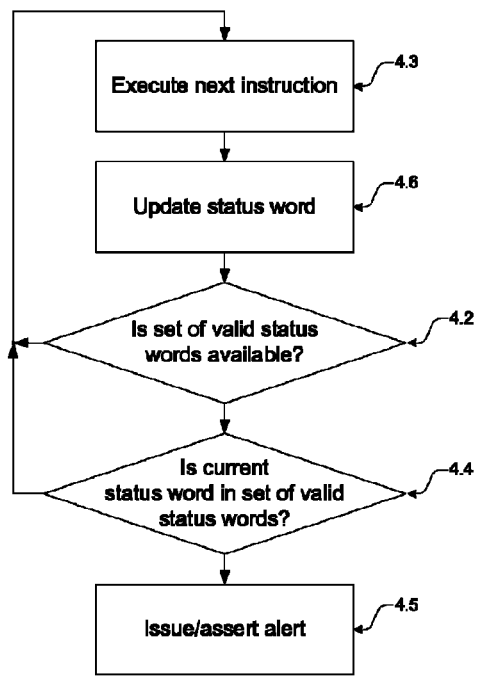
FIG. 4 shows a flow chart of an example of a method of executing an instruction sequence.

Turning now to FIG. 4, an example of a method of operating a processing device to execute an instruction sequence is described. In the context of the following description, the processing device for operating the sequence illustrated in FIG. 4, is or at least corresponds to the processing device 10 described above with reference to FIG. 3. The processing device may comprise a status register for providing a status word. A status word may be a tuple of status flags, e.g., the N, Z, V, and C status flags as implemented in a variety of existing processor designs. The status word held in the status register is updated in response to the execution of an instruction by the processing device. The instruction sequence may comprise a subsequence of one or more selected instructions. Upon execution of a selected instruction a status check is performed, i.e. the status word stored in the status register is checked for validity. The status check by the processing device may include, for each selected instruction: providing a set of valid status words; verifying whether the updated status word in the status register is in the set of valid status words; and initiating or asserting an alert action if the updated status word is not in the set of valid status words. For example, the instruction sequence may begin with the execution of a CPU instruction (box 4.3), in response to the result of which the state of the condition code flags in the status register are set. Afterwards a check may be performed to determine whether a set of valid status words is available for the status check (box 4.2). The set of valid status words has been embedded into the program code. In case a set of valid status words is available, the status monitor may be used to trigger the status check including verifying that the updated status word, i.e., the current condition code, is included in the available set (box 4.4). If the updated status word is not in the set of valid status words, the processing device may initiate or assert an alert action (box 4.5). If, however, the updated status word is in the set of valid status words, or if no set of valid status words is available for the current instruction, the processing device may proceed to process the next instruction. That is, the process flow may return to box 4.3. The operations described above with reference to boxes 4.2, 4.3, and 4.4 may be cyclically repeated until the end of the instruction sequence is reached.

In one example, the processing device may comprise dedicated hardware for monitoring the status word of the status register and for initiating/asserting the alert action in response to detecting that the status word of the status register is not in the set of valid status words. The status checks on the status word may thus be hidden from a processor of the processing device, e.g., by branching over the checks (see boxes 2.1, 2.2, and 2.3 illustratively shown in FIG. 2) or by hiding the checks in no-operation (NOP) instructions. The dedicated hardware, e.g., a status flag monitor, may be arranged to detect check instructions in the instruction stream, to evaluate them and to trigger a status check. The check instructions may comprise check codes (see PROP 1, PROP2, and PROP 3 in the boxes 2.1, 2.2 and 2.3 illustratively shown in FIG. 2), which comprises the sets of valid status words for the respective status check. The processing device may be arranged to detect the check code and to trigger the status check by the status flag monitor for the respective selected instruction on the basis of the check code. The set of valid status words comprised in the check code may be provided by the processing device to the status flag monitor.

Figures 5, 6:
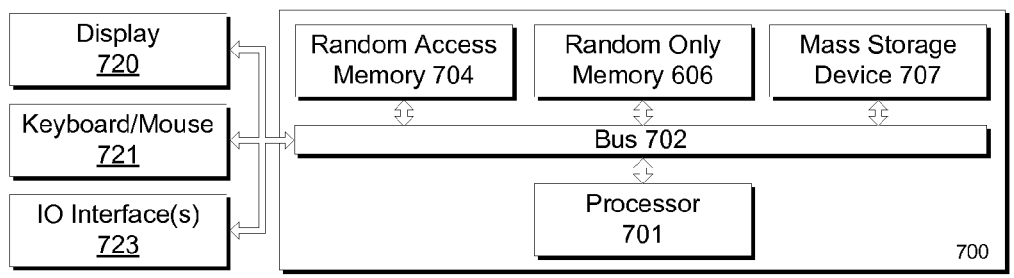
FIG. 5 schematically shows an example of an instruction sequence with embedded check instructions.
FIG. 6 illustrates a block diagram of a processing device that may be used to implement an example of the present invention.

In another example, the checks can be implemented in software. For example, a subroutine or an interrupt service routine (ISR) may be called to evaluate the status checks without additional hardware. An example of software-implemented status checks on the status word during execution of the instruction sequence is schematically illustrated in FIG. 5. FIG. 5 shows the instruction sequence of FIG. 1 with additional code portions 5.1, 5.2 and 5.3 inserted at different positions in the instruction sequence. Each of these code portions may comprise, for example, a set of two consecutive instructions SWI (Software Interrupt) and DW (Defined Word) exemplarily representing a check instruction, for instructing the processing device to verify whether the status word, i.e., the status word updated by the preceding instruction of the instruction sequence, is in the set of valid status words. When the status word is found to be not included in the set of valid status words, an alert action may be reported. The processing device 10 may be arranged to detect check instructions in the instruction sequence and to trigger said status checks by the status flag monitor in response to the detection of the check instructions.

The technique of monitoring status flags described herein may involve a hardware or software overhead which may be rather modest, in particular when compared to lock step. The technique may therefore be particularly useful for low cost safety applications.

This method of checking for valid system states, may not be limited to condition code flags. Other state indicators related to the computing unit (e.g., user/supervisor state and interrupt masks), peripheral IP (e.g., status registers and interrupt flags), or sensors monitoring environmental conditions (e.g., temperature thresholds, supply voltage ranges, and current consumption) may be monitored as well.

Notably, the invention may be implemented in a computer program for running on a computer system, for example as explained above with reference to FIGS. 2 and 5. The computer program may include at least code portions for performing steps of a method according to the invention when run on a programmable apparatus, such as a computer system or enabling a programmable apparatus to perform functions of a device or system according to the invention.

FIG. 6 illustrates a block diagram of a processing system that may be used to implement an example of the present invention. The computer system 700 includes a processor 702 coupled through a bus 701 to a random access memory (RAM) 704, a read only memory (ROM) 706, and a mass storage device 707. Mass storage device 707 represents a persistent data storage device, such as one or more fixed disk drive(s). The mass storage device 707 may be coupled via any data communication connection to the processing system. Processor 702 may be embodied in a general-purpose processor, an application processing device, a special purpose processor, or a specifically programmed logic device. One or more IO devices may be coupled via the bus 701 to the processing device 700. The IO devices may comprise inter alia a display device 720 coupled to the processor 702 through the bus 701 and provides graphical output for the processing system 700, a keyboard and/or cursor control unit 721 coupled to the bus 701 for communicating information and command selections to processor 602 and one or more further input/output (I/O) interfaces 723 also coupled to the processor 702 through the bus 701 and used to control and transfer data to peripheral electronic devices (printers, other computers, etc.) connected to processing system 700. It should be noted that the architecture of FIG. 6 is provided only for purposes of illustration, and that a processing system used in conjunction with the present invention is not limited to this specific architecture.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, the memory unit 14 and the status flag monitoring unit 16 may be integrated in the processor 12.

Any arrangement of components to achieve the same functionality is effectively associated such that the desired functionality is achieved. Hence, any two components herein combined to achieve a particular functionality can be seen as associated with each other such that the desired functionality is achieved, irrespective of architectures or intermedial components. Likewise, any two components so associated can also be viewed as being operably connected, or operably coupled, to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments. For example, the sets of valid status words may be determined prior to carrying out the instruction sequence or on the fly. Determining the sets of valid status words prior to carrying out the instruction sequence means that a set of valid status words may be determined for each selected instruction during creation time or development of the instruction sequence. For instance, a compiler, which is applied to build the instruction sequence from source code, may analyze the source code, select one or more instructions and determine the respective set of valid status words for each selected instruction. Alternatively or additionally, the developer of the instruction sequence may perform the selecting of instructions and/or determining the set of valid status words for a selected instruction.

The sets of valid status words may be stored in the memory of the processing device, in particular as part of the instruction sequence. The processing device may be arranged to retrieve a respective set of valid status words and to provide the retrieved set of valid status words to the status flag monitor or the status flag monitor may be arranged to retrieve the set of valid status words from the memory unit.

Moreover, the sets of valid status words for the selected instructions may be determined by the processing device prior to executing the instruction sequence. The processing device may be accordingly arranged. The sets of valid status words may be determined prior to execution of the instruction sequence in that the instruction sequence is analyzed by the processing device or an analyzing component thereof before starting the execution of the instruction sequence. The one or more input values to a selected instruction may be unknown at the time of determining the respective set of valid status words because the values of the inputs to the selected instruction are determined during run time of the instruction sequence. As described above, one or more inputs to a selected instruction, which values are unknown at the time of determining the set of valid data words, may be estimated or predicted in particular on the basis of values ranges and values limits.

The processing device may be further arranged to determine a set of valid status words on the fly while executing the instruction sequence and prior to execution of the selected instruction and to provide the set of valid status words to the status flag monitor.

Also for example, in one embodiment, the illustrated examples may be implemented as circuitry located on a single integrated circuit or within a same device. For example, the units 12, 14, and 16 in FIG. 3 may be part of a system on chip. Alternatively, the examples may be implemented as any number of separate integrated circuits or separate devices interconnected with each other in a suitable manner. For example, the units 12, 14, and 16 may be located on separate interconnected chips.

Figure 7:
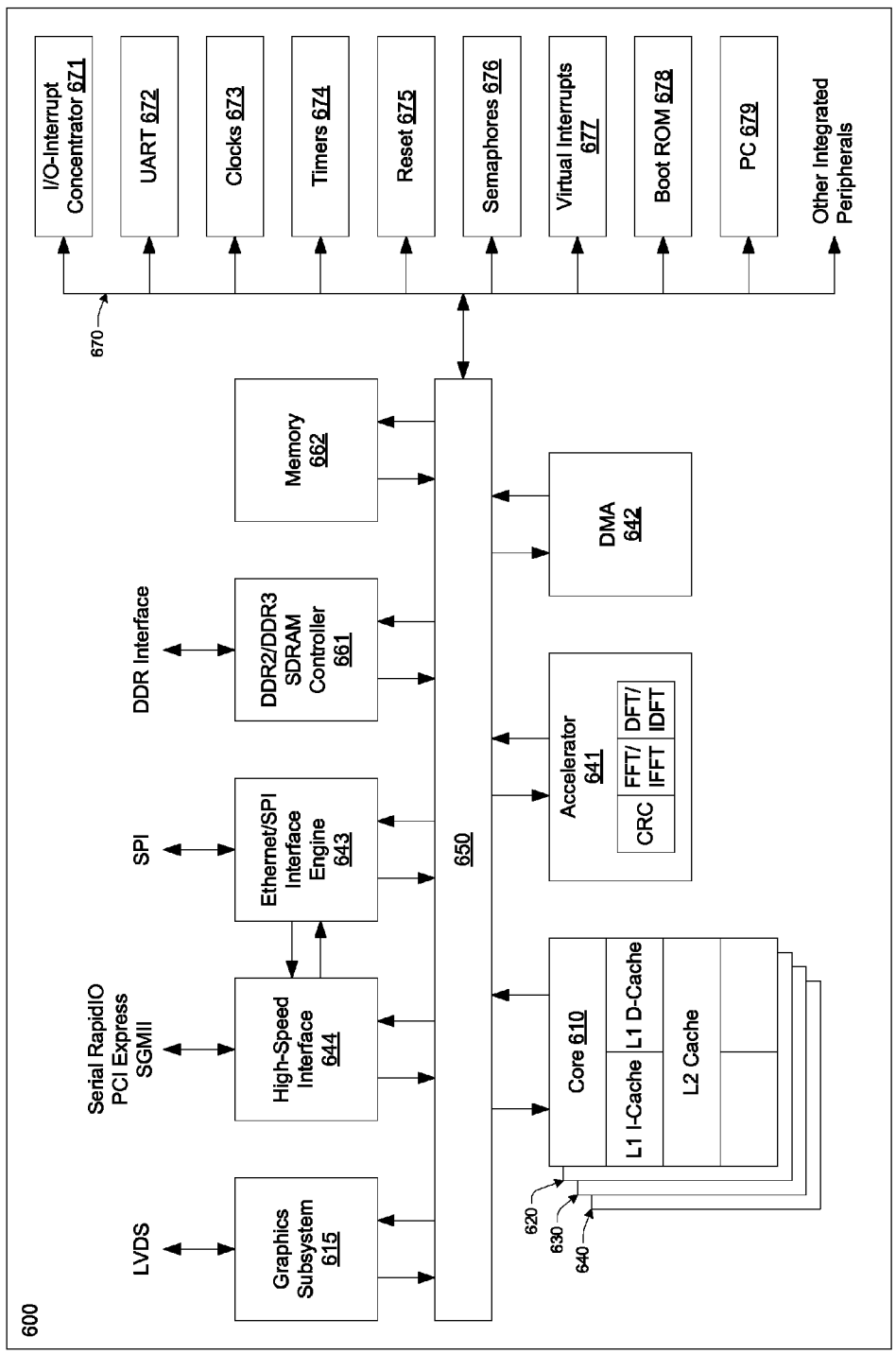
FIG. 7 illustrates a block diagram of a system on chip (SoC) device that may be used to implement an example of the present invention.

Referring now to FIG. 7, there is shown a simplified schematic diagram of a multi-core system on chip 600 having multiple processor cores 610, 620, 630, 640. As illustrated, each of the processor cores 610, 620, 630, 640 is coupled to one or more levels of cache memory, such as an L1 instruction cache (I-Cache), L1 data cache (D-Cache), and/or L2 cache. While the processor cores 610, 620, 630, 640 may be identically designed or homogenous, the multi-core SoC may also include one or more cores having a different design. For example, the depicted multi-core SoC 600 also includes an accelerator 641 which may include one or more processor cores for supporting hardware acceleration for DFT/iDFT and FFT/iFFT algorithms and for CRC processing. Each processor core is coupled across an interconnect bus 650 to one or more memory controllers 661, which are coupled in turn to one or more banks of system memory (not shown). The interconnect bus 250 also couples the processor cores to a Direct Memory Access (DMA) controller 642, network interface 643, a high speed serial interface 644, and to other hardware-implemented integrated peripherals 671 to 679. The interconnect bus 650 may be a coherency fabric.

Each of the processor cores 610, 620, 630, 640 may be configured to execute instructions and to process data according to a particular instruction set architecture (ISA), such as x86, PowerPC, SPARC, MIPS, and ARM, for example. Those of ordinary skill in the art also understand the present invention is not limited to any particular manufacturer's microprocessor design. The processor core may be found in many forms including, for example, any 32-bit or 64-bit microprocessor manufactured by Freescale, Motorola, Intel, AMD, Sun or IBM. However, any other suitable single or multiple microprocessors, microcontrollers, or microcomputers may be utilized. In the illustrated embodiment, each of the processor cores 610, 620, 630, 640 may be configured to operate independently of the others, such that all cores may execute in parallel. In some embodiments, each of cores may be configured to execute multiple threads concurrently, where a given thread may include a set of instructions that may execute independently of instructions from another thread. Such a core may also be referred to as a multithreaded (MT) core. Thus, a single multi-core SoC 600 with four cores will be capable of executing a multiple of four threads in this configuration. However, it should be appreciated that the invention is not limited to four processor cores and that more or fewer cores can be included. In addition, the term "core" refers to any combination of hardware, software, and firmware typically configured to provide a processing functionality with respect to information obtained from or provided to associated circuitry and/or modules (e.g., one or more peripherals, as described below). Such cores include, for example, digital signal processors (DSPs), central processing units (CPUs), microprocessors, and the like. These cores are often also referred to as masters, in that they often act as a bus master with respect to any associated peripherals. Furthermore, the term multi-core (or multi-master) refers to any combination of hardware, software, and firmware that that includes two or more such cores (e.g., cores 610 and 620), regardless of whether the individual cores are fabricated monolithically (i.e., on the same chip) or separately. Thus, a second core may be the same physical core as first core, but has multiple modes of operation (i.e., a core may be virtualized).

As depicted, each processor core (e.g., 610) may include a first level (L1) cache which includes a data cache (D-Cache) and an instruction cache (I-Cache). In addition, a second level of cache memory (L2) may also be provided at each core, though the L2 cache memory can also be an external L2 cache memory which is shared by one or more processor cores. The processor core 610 executes instructions and processes data under control of the operating system (OS) which may designate or select the processor core 610 as the control or master node for controlling the workload distribution amongst the processor cores 610, 620, 630, 640. Communication between the cores 610, 620, 630, 640 may be over the interconnect bus 650 or over a crossbar switch and appropriate dual point to point links according to, for example, a split-transaction bus protocol such as the HyperTransport (HT) protocol (not shown).

The processor cores 610, 620, 630, 640 and accelerator 641 are in communication with the interconnect bus 650 which manages data flow between the cores and the memory. The interconnect bus 650 may be configured to concurrently accommodate a large number of independent accesses that are processed on each clock cycle, and enables communication data requests from the processor cores 610, 620, 630, 640 to external system memory and/or an on-chip memory 662, as well as data responses therefrom. In selected embodiments, the interconnect bus 650 may include logic (such as multiplexers or a switch fabric, for example) that allows any core to access any bank of memory, and that conversely allows data to be returned from any memory bank to any core. The interconnect bus 650 may also include logic to queue data requests and/or responses, such that requests and responses may not block other activity while waiting for service. Additionally, the interconnect bus 650 may be configured as a chip-level arbitration and switching system (CLASS) to arbitrate conflicts that may occur when multiple cores attempt to access a memory or vice versa.

The interconnect bus 650 is in communication with main memory controller 661 to provide access to the memory 662 or main memory (not shown). Memory controller 661 may be configured to manage the transfer of data between the multi-core SoC 600 and system memory, for example. In some embodiments, multiple instances of memory controller 661 may be implemented, with each instance configured to control a respective bank of system memory. Memory controller 661 may be configured to interface to any suitable type of system memory, such as Double Data Rate or Double Data Rate 2 or Double Data Rate 3 Synchronous Dynamic Random Access Memory (DDR/DDR2/DDR3 SDRAM), or Rambus DRAM (RDRAM), for example. In some embodiments, memory controller 661 may be configured to support interfacing to multiple different types of system memory. In addition, the Direct Memory Access (DMA) controller 642 may be provided which controls the direct data transfers to and from system memory via memory controller 661.

The multi-core SoC 600 may comprise a dedicated graphics sub-system 615. The graphics sub-system 615 may be configured to manage the transfer of data between the multi-core SoC 600 and graphics sub-system 615, for example, through the interconnect bus 250. The graphics sub-system 615 may include one or more processor cores for supporting hardware accelerated graphics generation. The graphics generated by the graphics sub-system 615 may be outputted to one or more displays via any display interface such as LVDS, HDMI, DVI and the like.

As will be appreciated, the multi-core SoC 600 may be configured to receive data from sources other than system memory. To this end, a network interface engine 643 may be configured to provide a central interface for handling Ethernet and SPI interfaces, thus off-loading the tasks from the cores. In addition, a high speed serial interface 644 may be configured to support one or more serial RapidIO ports, a PCI-Express Controller, and/or a serial Gigabit Media Independent Interface (SGMII). In addition, one or more interfaces 670 may be provided which are configured to couple the cores to external boot and/or service devices, such as I/O interrupt concentrators 671, UART device(s) 672, clock(s) 673, timer(s) 674, reset 675, hardware semaphore(s) 676, virtual interrupt(s) 677, Boot ROM 678, 12C interface 679, GPIO ports, and/or other modules.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim 1ncludes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A processing device for executing an instruction sequence, wherein the processing device comprises:
   a status register arranged to provide a status word, the status word comprises a total of K status flags;
   a set of valid status words, the set of valid status words is provided in the form of a bit string of length 2**K; and
   a status flag monitor,
   the processing device is arranged to update the status word in response to execution of an instruction,
   the instruction sequence comprises a subsequence of one or more selected instructions,
   upon execution of one of the selected instructions by the processing device, the processing device is further arranged to trigger a status check by the status flag monitor, the status flag monitor is arranged to:
   verify whether the updated status word in the status register is in a set of valid status words, the processing device is further arranged to provide the set of valid status words to the status flag monitor; and
   to assert an alert action if the updated status word is not in the set of valid status words.

2. The processing device of claim 1, arranged to determine, for each of the selected instructions, a set of valid status words prior to executing the instruction sequence.

3. The processing device of claim 2, further arranged to determine the set of valid status words on the basis of the instruction sequence and on the basis of one or more estimations about input data of the selected instruction.

4. The processing device of claim 1, further comprising a memory unit arranged to store, for each of the selected instructions, a set of valid status words corresponding to each of the selected instructions, wherein the processing device is arranged to provide the set of valid status words for each of the corresponding selected instructions to the status flag monitor.

5. The processing device of claim 1, arranged to determine, for each of the selected instructions, a set of valid status words on the fly while executing the instruction sequence and to provide the set of valid status words to the status flag monitor.

6. The processing device of claim 1, where the instruction sequence comprises one or more non-selected instructions, which are not in the subsequence of selected instructions.

7. The processing device of claim 6, wherein the processing device is arranged, in response to execution of each of the non-selected instructions, to set the status word to a value, which is independent of input data of the instruction sequence and results of preceding instructions of the instruction sequence.

8. The processing device of claim 7 wherein the processing device is arranged, in response to execution of each of the selected instructions, to set the status word to a value, which depends on at least one of input data of the instruction sequence and on results of preceding instructions of the instruction sequence.

9. The processing device of claim 6 wherein the processing device is arranged, in response to execution of each of the selected instructions, to set the status word to a value, which depends on at least one of input data of the instruction sequence and on results of preceding instructions of the instruction sequence.

10. The processing device of claim 1, wherein the processing device is arranged, in response to execution of each of the selected instructions, to set the status word to a value, which depends on at least one of input data of the instruction sequence and on results of preceding instructions of the instruction sequence.

11. The processing device of claim 1, wherein the instruction sequence comprises check instructions, wherein the processing device is arranged to trigger said status checks by the status flag monitor in response to the detection of the check instructions.

12. The processing device of claim 1, wherein the instruction sequence comprises, for each of the selected instructions, a corresponding check code, wherein the processing device is arranged to trigger the status check by the status flag monitor for the respective selected instruction on the basis of the check code.

13. The processing device of claim 1, implemented on a single chip.

14. A method of operating a processing device to execute an instruction sequence, wherein the processing device comprises a status register for providing a status word, the status word comprises a total of K status flags, wherein the method comprises:
   updating the status word in response to executing an instruction by the processing device, wherein the instruction sequence comprises a subsequence of one or more selected instructions; and
   performing a status check in response to executing one of the selected instructions by the processing device, wherein the status check comprises:
   providing a set of valid status words, the set of valid status words is provided in the form of a bit string of length 2**K;
   verifying whether the updated status word is in the set of valid status words; and
   asserting an alert action if the updated status word is not in the set of valid status words.

15. A method of operating a processing device to execute an instruction sequence, wherein the processing device comprises a status register for providing a status word, the status word comprises a total of K status flags, wherein the method comprises:
   updating the status word in response to executing an instruction by the processing device, wherein the instruction sequence comprises a subsequence of one or more selected instructions;
   performing a status check in response to executing one of the selected instructions by the processing device, wherein the status check comprises:
   providing a set of valid status words, the set of valid status words is provided in the form of a bit string of length 2**K;
   verifying whether the updated status word is in the set of valid status words; and
   asserting an alert action if the updated status word is not in the set of valid status words; and
   determining the subsequence of one or more selected instructions in dependence of application-related parameters.

16. The method of claim 15, wherein said application related parameters include one or more of the following parameters: available memory space, computing performance, and safety relevance.

17. The method of claim 15, further comprising:
determining, for each one of the selected instructions, a set of valid status words prior to executing the instruction sequence.

18. The method of claim 15, further comprising:
determining the set of valid status words on the basis of the instruction sequence and on the basis of one or more estimations about input data of each one of the selected instructions.

* * * * *